(12) United States Patent
Yanagi

(10) Patent No.: US 11,639,754 B2
(45) Date of Patent: May 2, 2023

(54) POSITIVE/NEGATIVE PRESSURE GASKET

(71) Applicant: NOK CORPORATION, Tokyo (JP)

(72) Inventor: Tokunori Yanagi, Makinohara (JP)

(73) Assignee: NOK CORPORATION

( * ) Notice: Subject to any disclaimer, the term of this patent is extended or adjusted under 35 U.S.C. 154(b) by 0 days.

(21) Appl. No.: 17/644,156

(22) Filed: Dec. 14, 2021

(65) Prior Publication Data

US 2022/0128147 A1 Apr. 28, 2022

Related U.S. Application Data

(62) Division of application No. 16/500,720, filed on Oct. 3, 2019, now Pat. No. 11,333,248.

(51) Int. Cl.
| | |
|---|---|
| *F16J 15/12* | (2006.01) |
| *F16J 15/02* | (2006.01) |
| *F16J 15/06* | (2006.01) |
| *F16J 15/10* | (2006.01) |

(52) U.S. Cl.
CPC ........... *F16J 15/121* (2013.01); *F16J 15/025* (2013.01); *F16J 15/061* (2013.01); *F16J 15/104* (2013.01)

(58) Field of Classification Search
CPC ........ F16J 15/025; F16J 15/061; F16J 15/062; F16J 15/104; F16J 15/121; F16J 15/125
See application file for complete search history.

(56) References Cited

U.S. PATENT DOCUMENTS

| | | | |
|---|---|---|---|
| 5,409,337 A | 4/1995 | Muyskens et al. | |
| 5,588,656 A | 12/1996 | Matsushima | |
| 6,702,293 B2 | 3/2004 | Endo et al. | |
| 7,647,864 B2 * | 1/2010 | Watanabe | F16D 25/12 277/437 |
| 7,854,434 B2 * | 12/2010 | Heiman | F16J 15/121 277/651 |
| 8,814,174 B2 | 8/2014 | Okuda et al. | |

(Continued)

FOREIGN PATENT DOCUMENTS

| | | |
|---|---|---|
| CN | 1105430 A | 7/1995 |
| CN | 2385156 Y | 6/2000 |

(Continued)

OTHER PUBLICATIONS

Extended European Search Report dated Jan. 14, 2021 for European Patent Application No. 18787313.8 (41 pages).

*Primary Examiner* — Nicholas L Foster
(74) *Attorney, Agent, or Firm* — Harness, Dickey & Pierce, P.L.C.

(57) ABSTRACT

A sealing arrangement is provided for sealing a mounting groove formed in a first or second mounting member separated by a gap and defining a hydraulic passage. A gasket is mounted in the groove between the passage and gap. The gasket includes an annular gasket body having first and second axial ends and a buried reinforcement ring. The gasket body includes a unitary flange extending radially outward from the first axial end. The flange includes a first seal lip extending axially outward from the flange proximate the passage or gap. The first seal lip contacts a surface of the first or second mounting member facing the passage. The gasket body includes a second seal lip extending outward from the second axial end to contact a bottom surface of the mounting groove.

5 Claims, 7 Drawing Sheets

(56) References Cited

U.S. PATENT DOCUMENTS

| | | | |
|---|---|---|---|
| 10,197,162 B2 | 2/2019 | Yanagi | |
| 10,612,660 B2 | 4/2020 | Yanagi et al. | |
| 11,333,248 B2 * | 5/2022 | Yanagi | F16J 15/061 |
| 11,460,109 B2 * | 10/2022 | Makinae | F16J 15/127 |
| 2005/0053420 A1 * | 3/2005 | Blaszynski | F16J 15/025 |
| | | | 403/122 |
| 2008/0143053 A1 | 6/2008 | Kanzaki | |
| 2008/0251347 A1 | 10/2008 | Watanabe et al. | |
| 2008/0252020 A1 * | 10/2008 | Heiman | F16J 15/121 |
| | | | 277/593 |
| 2009/0032366 A1 | 2/2009 | Goto | |
| 2013/0106064 A1 | 5/2013 | Okuda et al. | |
| 2017/0089465 A1 | 3/2017 | Yanagi | |
| 2019/0032783 A1 | 1/2019 | Yanagi et al. | |
| 2020/0191273 A1 * | 6/2020 | Yanagi | F16J 15/061 |
| 2021/0164570 A1 | 6/2021 | Amano et al. | |
| 2021/0404556 A1 * | 12/2021 | Hagiwara | F16J 15/061 |

FOREIGN PATENT DOCUMENTS

| | | | |
|---|---|---|---|
| CN | 101002041 A | 7/2007 | |
| CN | 203146815 U | 8/2013 | |
| EP | 3412941 A1 | 12/2018 | |
| GB | 853996 A | 11/1960 | |
| JP | S62-34260 U | 2/1987 | |
| JP | H01-261564 A | 10/1989 | |
| JP | H05-47619 U | 6/1993 | |
| JP | H06-032834 U | 4/1994 | |
| JP | H1026228 A | 1/1998 | |
| JP | 2012-067790 A | 4/2012 | |
| WO | 2012-005165 A1 | 1/2012 | |

\* cited by examiner

POSITIVE/NEGATIVE PRESSURE GASKET

CROSS REFERENCE TO RELATED APPLICATIONS

This application is a divisional of U.S. patent application Ser. No. 16/500,720 filed Oct. 3, 2019, which is a National Phase application of International Application No. PCT/JP2018/010151, filed on Mar. 15, 2018 and published in Japanese as WO 2018/193766 on Oct. 25, 2018 and claims priority to Japanese Patent Application No. 2017-082695, filed on Apr. 19, 2017. The entire disclosures of the above applications are expressly incorporated by reference herein.

BACKGROUND

Technical Field

The disclosure relates to a positive/negative pressure gasket.

Related Art

Oil passage gaskets used in the automobile-related field, the field of automobile accessories, the field of general industrial machineries, etc. include inward-slanting lips 51 as shown in FIG. 7 or outward-slanting lips (a case where respective inner and outer diameters of the inward-slanting lips are reversed, not shown) to ensure the pressure tightness. These inward-slanting lips 51 or outward-slanting lips basically have a seal design for one direction (a seal in the opposite direction is limited to low pressure).

Under a condition where both positive pressure and negative pressure are applied, with sufficient dimensional accuracy of a gasket mounting groove ensured, a seal design using, for example, an O-ring or an X-ring without seal directionality is adopted.

However, in recent years, there is a case where it fails to ensure the existing groove accuracy due to changes in material (from iron or aluminum to resin) to reduce weight, components becoming complex (accumulated tolerances of many components), reduction of processing on a molding surface, etc. In this case, in conventional design technologies, it is difficult to achieve both the mitigation of the groove accuracy and the sealing of both positive pressure and negative pressure.

It is desired to provide a gasket that makes it possible to ensure the sealing of both positive pressure and negative pressure even if the dimensional accuracy requirement of a gasket mounting groove is relaxed.

SUMMARY

An aspect of a positive/negative pressure gasket includes: an annular gasket body with a reinforcement ring buried therein, the gasket body configured to be mounted in a gasket mounting groove that opens in a radial direction of a mounting member and is provided with a gap on a groove bottom surface thereof; a flange that is provided to extend from one axial end of the gasket body toward a direction opposite to an opening direction of the mounting member; a one-end-side seal lip that is provided to extend from the one axial end of the gasket body toward one side in an axial direction and the opening direction of the mounting member, and is configured to come in contact with one axial side surface of the gasket mounting groove when the gasket body is mounted in the gasket mounting groove; and an other-end-side seal lip that is provided to extend from another axial end of the gasket body toward another side in the axial direction and the direction opposite to the opening direction of the mounting member, and is configured to come in contact with another axial side surface and a bottom surface of the gasket mounting groove when the gasket body is mounted in the gasket mounting groove.

Another aspect of the positive/negative pressure gasket includes: an annular gasket body with a reinforcement ring buried therein, the gasket body configured to be mounted in a gasket mounting groove that opens in a radial direction of a mounting member and is provided with a gap on a groove bottom surface thereof; a flange that is provided to extend from one axial end of the gasket body toward a direction opposite to an opening direction of the mounting member; a one-end-side seal lip that is provided to extend from the one axial end of the gasket body toward one side in an axial direction and the opening direction of the mounting member; a one-end-side sub seal lip that has a length dimension larger than an axial height dimension of the one-end-side seal lip, and is provided to extend from the flange toward the one side in the axial direction and the direction opposite to the opening direction of the mounting member; and an other-end-side seal lip that is provided to extend from another axial end of the gasket body toward another side in the axial direction and the direction opposite to the opening direction of the mounting member.

Effect

It is possible to ensure the sealing of both positive pressure and negative pressure even if the dimensional accuracy requirement of a gasket mounting groove is relaxed.

BRIEF DESCRIPTION OF THE DRAWINGS

FIG. 1A is a half sectional view showing a state before the gasket is mounted, and FIG. 1B is a half sectional view showing a state after the gasket is mounted.

FIG. 2A is a half sectional view showing a state before the gasket is mounted, and FIG. 2B is a half sectional view showing a state after the gasket is mounted.

FIG. 3A is a half sectional view showing a state before the gasket is mounted, and FIG. 3B is a half sectional view showing a state after the gasket is mounted.

FIG. 5A is a half sectional view showing a state before the gasket is mounted, and FIG. 5B is a half sectional view showing a state after the gasket is mounted.

DETAILED DESCRIPTION

First Embodiment

Figure 1A:
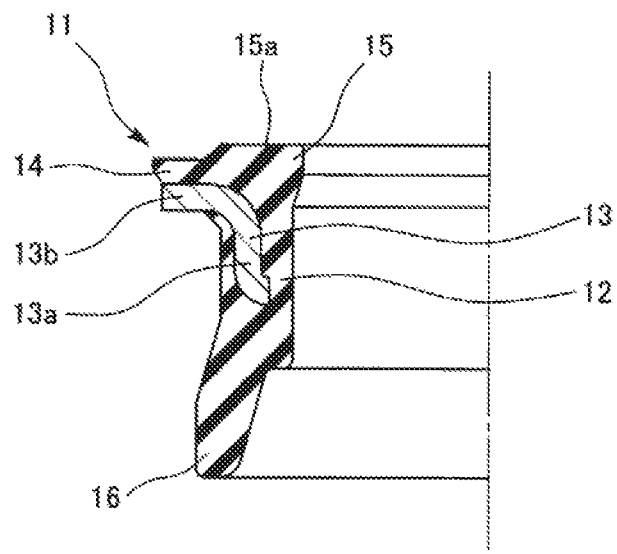
FIGS. 1A and 1B are diagrams showing a gasket according to a first embodiment.
Figure 1B:
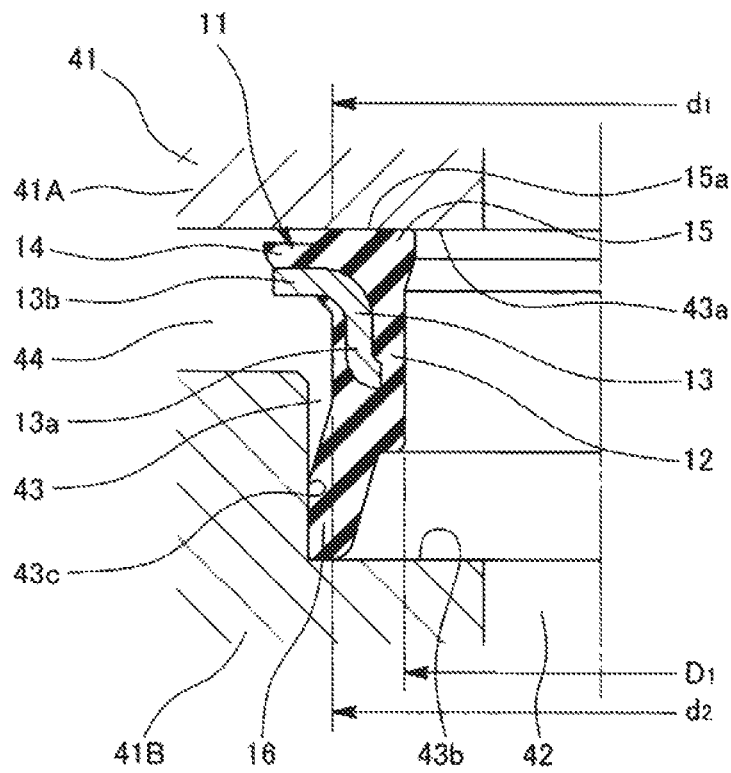

FIGS. 1A and 1B show a half section of a gasket 11 according to a first embodiment. The gasket 11 according to the present embodiment is applied to a joint seal or the like in an automatic transmission (AT) of a vehicle such as an automobile, and is mounted in a gasket mounting groove 43 provided on an inner diameter portion of a mounting member 41 such as a housing or a flange that includes a hydraulic passage 42, and seals hydraulic pressure.

In the present embodiment, the hydraulic passage 42 is provided on the inner diameter side of the mounting member 41, and the gasket mounting groove 43 is provided on the inner diameter portion of the mounting member 41 so as to open toward this hydraulic passage 42. The mounting member 41 is divided into two in an axial direction at a position of one axial (in the drawing, upper) end of a bottom surface (a groove bottom surface) 43c of the gasket mounting groove 43, and is a combination of one mounting member 41A and the other mounting member 41B. A gap 44 in the axial direction is provided between the two mounting members 41A and 41B. The gap 44 serves as a back-side hydraulic passage with respect to the gasket 11. Therefore, the gasket 11 according to the present embodiment is mounted in the gasket mounting groove 43 that opens to the radially inside where the hydraulic passage 42 is present and is provided with the gap (the back-side hydraulic passage) 44 on its groove bottom surface.

As shown in FIG. 1A, a gasket body 12 of the gasket 11 is formed by burying a reinforcement ring 13 made of a rigid material such as metal in an annular body (a rubber annular body) including a predetermined rubber-like elastic body. This gasket body 12 having a rectangular shape in cross-section is integrally provided with a flange 14 extending from one axial (in the drawing, upper) end of the gasket body 12 toward the radially outside.

The reinforcement ring 13 is integrally provided with an annular flat portion 13b extending from one axial end of a tubular portion 13a toward the radially outside. The tubular portion 13a is buried in the gasket body 12 to make the gasket body 12 less likely to be deformed. The flat portion 13b is buried in the flange 14, or is disposed along an axial end surface of the flange 14. In either case, this flat portion 13b supports the flange 14, and thus the flange 14 is less likely to be deformed.

The gasket body 12 is integrally provided with an annular one-end-side seal lip 15 extending obliquely from the one axial end of the gasket body 12 toward one side in the axial direction and the radially inside.

The gasket body 12 is integrally provided with an annular other-end-side seal lip 16 extending obliquely from the other axial (in the drawing, lower) end of the gasket body 12 toward the other side in the axial direction and the radially outside.

As shown in FIG. 1B, the gasket 11 is mounted in the annular gasket mounting groove 43 provided on the inner diameter portion of the mounting member 41. The gasket mounting groove 43 has a rectangular shape in cross-section, and opens to the radially inside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and an outer diameter dimension of the flange 14 is set to be larger than a diameter dimension of the bottom surface 43c of the mounting groove 43; therefore, when the gasket 11 is mounted in the mounting groove 43, at least a part on outer-diameter side of the flange 14 is housed in the gap 44.

When the gasket 11 is mounted in the mounting groove 43, a contact portion 15a that is a lip tip of the one-end-side seal lip 15 comes in contact with one axial side surface 43a of the mounting groove 43. The contact portion 15a has a predetermined width in a radial direction. While in a mounted state, an outer diameter dimension d1 of the contact portion 15a of the one-end-side seal lip 15 is set to be equal to an outer diameter dimension d2 of the base of the flange 14 (an outer diameter dimension of the gasket body 12) (d1=d2), and thus the pressures acting on both sides of the flange 14 in the axial direction cancel each other. When the gasket 11 is mounted in the mounting groove 43, the other-end-side seal lip 16 comes in contact with the other axial side surface 43b and the bottom surface 43c of the mounting groove 43.

Positive pressure acts on the gasket 11 from its inner diameter side, and thus the gasket 11 receives this inner-diameter-side positive pressure and seals this pressure. At this time, the outer diameter side of the gasket 11 (the side of the gap 44) is under negative pressure. Hereinafter, this state is referred to also as "under positive pressure".

Positive pressure may sometimes act on the gasket 11 from its outer diameter side (the side of the gap 44), and thus the gasket 11 receives this outer-diameter-side positive pressure and seals this pressure. At this time, the inner diameter side of the gasket 11 is under negative pressure. Hereinafter, this state is referred to also as "under negative pressure".

Under positive pressure, the one-end-side seal lip 15 is subjected to the positive pressure from the inner diameter side of the gasket 11 and is pressed against the one axial side surface 43a of the mounting groove 43, and the other-end-side seal lip 16 is pressed against the bottom surface 43c of the mounting groove 43, and thus the sealing is ensured.

Under negative pressure, the other-end-side seal lip 16 is subjected to the positive pressure from the outer diameter side of the gasket 11 and is deformed to rise (is deformed in a direction that makes the angle of inclination to a gasket center axis line smaller), thus the entire gasket 11 is displaced to the one side in the axial direction, and the one-end-side seal lip 15 is pressed hard against the one axial side surface 43a of the mounting groove 43. Therefore, the other-end-side seal lip 16 is pressed against the other axial side surface 43b of the mounting groove 43, and the one-end-side seal lip 15 is pressed hard against the one axial side surface 43a of the mounting groove 43, and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

The outer diameter dimension d1 of the contact portion 15a of the one-end-side seal lip 15 is set to be equal to the outer diameter dimension d2 of the base of the flange 14 (d1=d2), and thus the pressures acting on the both sides of the flange 14 in the axial direction cancel each other. Therefore, the entire gasket 11 is not displaced to the one side or the other side in the axial direction by the pressures acting on the flange 14 provided to reinforce the gasket body 12, and thus it is possible to prevent the occurrence of a situation where contact surface pressure of the one-end-side seal lip 15 applied to the side surface 43a of the mounting groove 43 is reduced, which reduces the sealing or a situation where contact surface pressure of the other-end-side seal lip 16 applied to the side surface 43b of the mounting groove 43 is reduced, which reduces the sealing.

As for the above-described radial dimensional data, as described above, d1=d2 in a mounted state is preferred; however, it is not limited to this, and may be d1>d2. To the contrary, if the displacement of the entire gasket 11 to the other side in the axial direction is within a small amount range, it may be d1<d2. The outer diameter dimension d1 of the contact portion 15a of the one-end-side seal lip 15 in a mounted state only has to at least be larger than an inner diameter dimension D1 of the gasket body 12 (d1>D1).

As another aspect of the present embodiment, for example, to prevent the gasket 11 from coming off the gasket mounting groove 43, an interference may be given to the outer periphery of the other-end-side seal lip 16.

Second Embodiment

The arrangement of components of the gasket 11 according to the above-described first embodiment may be inverted in the radial direction. An aspect of this inversion is described as a second embodiment.

Figure 2A:
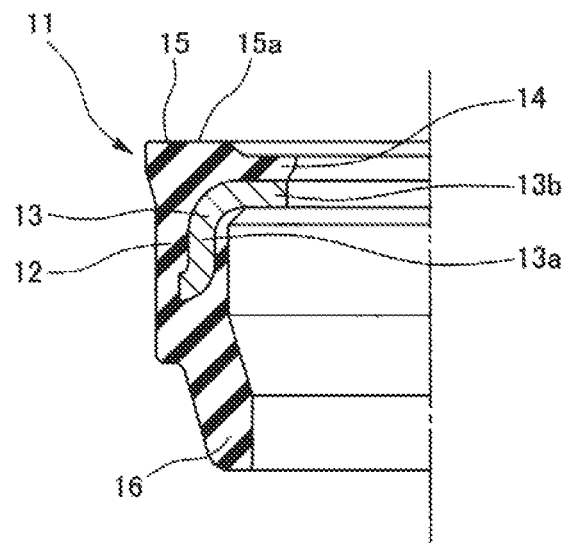
FIGS. 2A and 2B are diagrams showing a gasket according to a second embodiment.
Figure 2B:
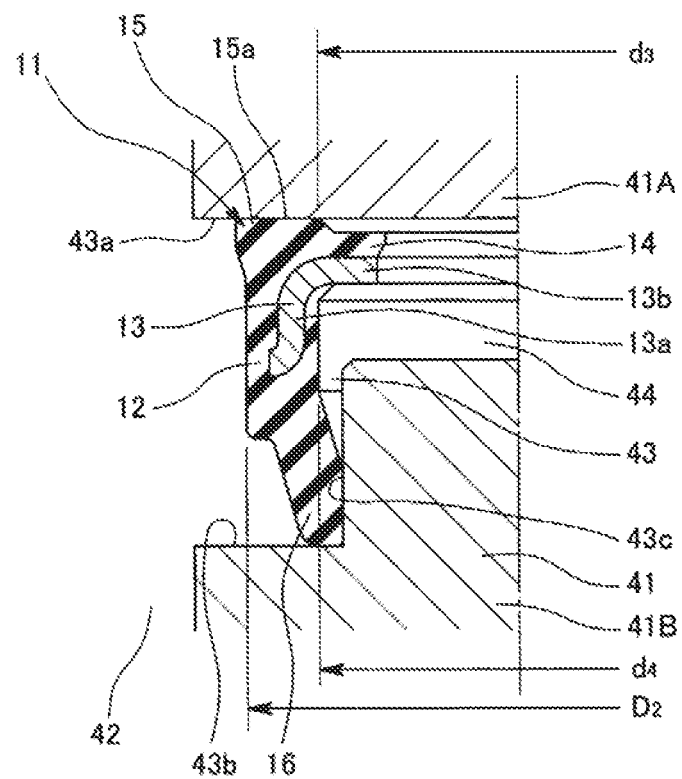

FIGS. 2A and 2B show a half section of the gasket 11 according to the second embodiment. The gasket 11 according to the present embodiment is applied to a joint seal or the like in an automatic transmission (AT) of a vehicle such as an automobile, and is mounted in the gasket mounting groove 43 provided on an outer diameter portion of the mounting member 41 such as a housing or a flange that includes the hydraulic passage 42, and seals hydraulic pressure.

In the present embodiment, the hydraulic passage 42 is provided on the outer diameter side of the mounting member 41, and the gasket mounting groove 43 is provided on the outer diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B. The gap 44 serves as a back-side hydraulic passage with respect to the gasket 11. Therefore, the gasket 11 according to this embodiment is mounted in the gasket mounting groove 43 that opens to the radially outside where the hydraulic passage 42 is present and is provided with the gap (the back-side hydraulic passage) 44 on its groove bottom surface.

As shown in FIG. 2A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially inside.

The reinforcement ring 13 is integrally provided with the annular flat portion 13b extending from the one axial end of the tubular portion 13a toward the radially inside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially outside.

The gasket body 12 is integrally provided with the annular other-end-side seal lip 16 extending obliquely from the other axial (in the drawing, lower) end of the gasket body 12 toward the other side in the axial direction and the radially inside.

As shown in FIG. 2B, the gasket 11 is mounted in the annular gasket mounting groove 43 provided on the outer diameter portion of the mounting member 41. The gasket mounting groove 43 has a rectangular shape in cross-section, and opens to the radially outside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and an inner diameter dimension of the flange 14 is set to be smaller than the diameter dimension of the bottom surface 43c of the mounting groove 43; therefore, when the gasket 11 is mounted in the mounting groove 43, at least a part on outer-diameter side of the flange 14 is housed in the gap 44.

When the gasket 11 is mounted in the mounting groove 43, the contact portion 15a that is the lip tip of the one-end-side seal lip 15 comes in contact with the one axial side surface 43a of the mounting groove 43. The contact portion 15a has a predetermined width in the radial direction. While in a mounted state, an inner diameter dimension d3 of the contact portion 15a of the one-end-side seal lip 15 is set to be equal to an inner diameter dimension d4 of the base of the flange 14 (an inner diameter dimension of the gasket body 12) (d3=d4), and thus the pressures acting on the both sides of the flange 14 in the axial direction cancel each other. Furthermore, when the gasket 11 is mounted in the mounting groove 43, the other-end-side seal lip 16 comes in contact with the other axial side surface 43b and the bottom surface 43c of the mounting groove 43.

Positive pressure acts on the gasket 11 from its outer diameter side, and thus the gasket 11 receives this outer-diameter-side positive pressure and seals this pressure. At this time, the inner diameter side of the gasket 11 (the side of the gap 44) is under negative pressure. Hereinafter, this state is referred to also as "under positive pressure".

Positive pressure may sometimes act on the gasket 11 from its inner diameter side (the side of the gap 44), and thus the gasket 11 receives this inner-diameter-side positive pressure and seals this pressure. At this time, the outer diameter side of the gasket 11 is under negative pressure. Hereinafter, this state is referred to also as "under negative pressure".

Under positive pressure, the one-end-side seal lip 15 is subjected to the positive pressure from the outer diameter side of the gasket 11 and is pressed against the one axial side surface 43a of the mounting groove 43, and the other-end-side seal lip 16 is pressed against the bottom surface 43c of the mounting groove 43, and thus the sealing is ensured.

Under negative pressure, the other-end-side seal lip 16 is subjected to the positive pressure from the inner diameter side of the gasket 11 and is deformed to rise (is deformed in the direction that makes the angle of inclination to the gasket center axis line smaller), thus the entire gasket 11 is displaced to the one side in the axial direction, and the one-end-side seal lip 15 is pressed hard against the one axial side surface 43a of the mounting groove 43. Therefore, the other-end-side seal lip 16 is pressed against the other axial side surface 43b of the mounting groove 43, and the one-end-side seal lip 15 is pressed hard against the one axial side surface 43a of the mounting groove 43, and thus the sealing is ensured.

Therefore, whether the outer diameter side of the gasket 11 is under positive pressure or negative pressure, the sealing can be ensured, thus it is possible to ensure the sealing of both positive pressure and negative pressure even if the dimensional accuracy requirement of the gasket mounting groove 43 is relaxed.

The inner diameter dimension d3 of the contact portion 15a of the one-end-side seal lip 15 is set to be equal to the inner diameter dimension d4 of the base of the flange 14 (d3=d4), and thus the pressures acting on the both sides of the flange 14 in the axial direction cancel each other. Therefore, the entire gasket 11 is not displaced to the one side or the other side in the axial direction by the pressures acting on the flange 14 provided to reinforce the gasket body 12, and thus it is possible to prevent the occurrence of a situation where contact surface pressure of the one-end-side seal lip 15 applied to the side surface 43a of the mounting groove 43 is reduced, which reduces the sealing or a situation where contact surface pressure of the other-end-side seal lip 16 applied to the side surface 43b of the mounting groove 43 is reduced, which reduces the sealing.

As for the above-described radial dimensional data, as described above, d3=d4 in a mounted state is preferred; however, it is not limited to this, and may be d3<d4. To the contrary, if the displacement of the entire gasket 11 to the other side in the axial direction is within a small amount range, it may be d3>d4. The inner diameter dimension d3 of the contact portion 15a of the one-end-side seal lip 15 in a mounted state only has to at least be smaller than an outer diameter dimension D2 of the gasket body 12 (d3<D2).

As another aspect of the present embodiment, for example, to prevent the gasket 11 from coming off the gasket mounting groove 43, an interference may be given to the outer periphery of the other-end-side seal lip 16.

Third Embodiment

Figure 3A:
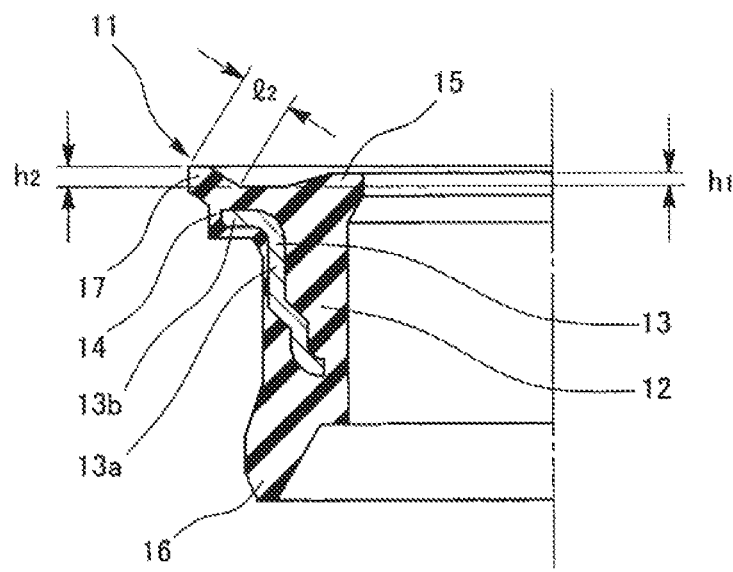
FIGS. 3A and 3B are diagrams showing a gasket according to a third embodiment.
Figure 3B:
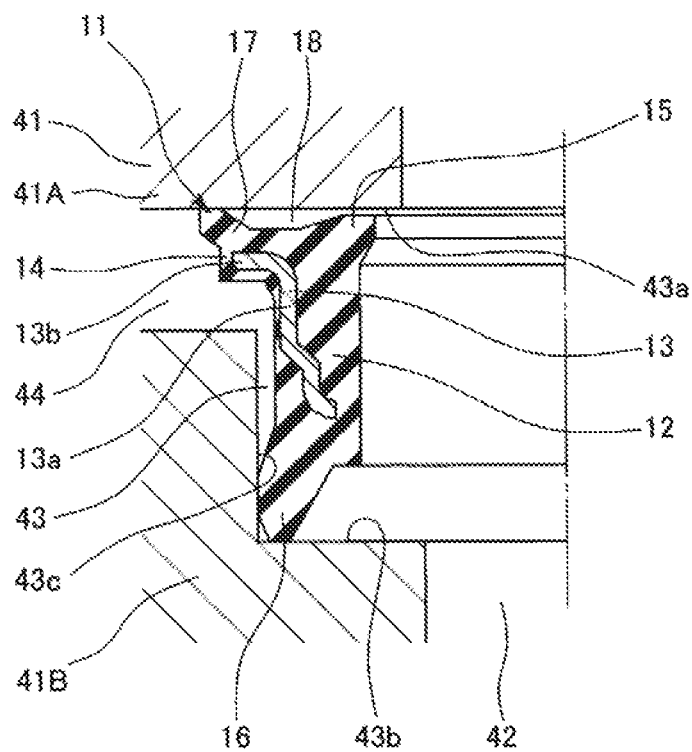
Figure 4:
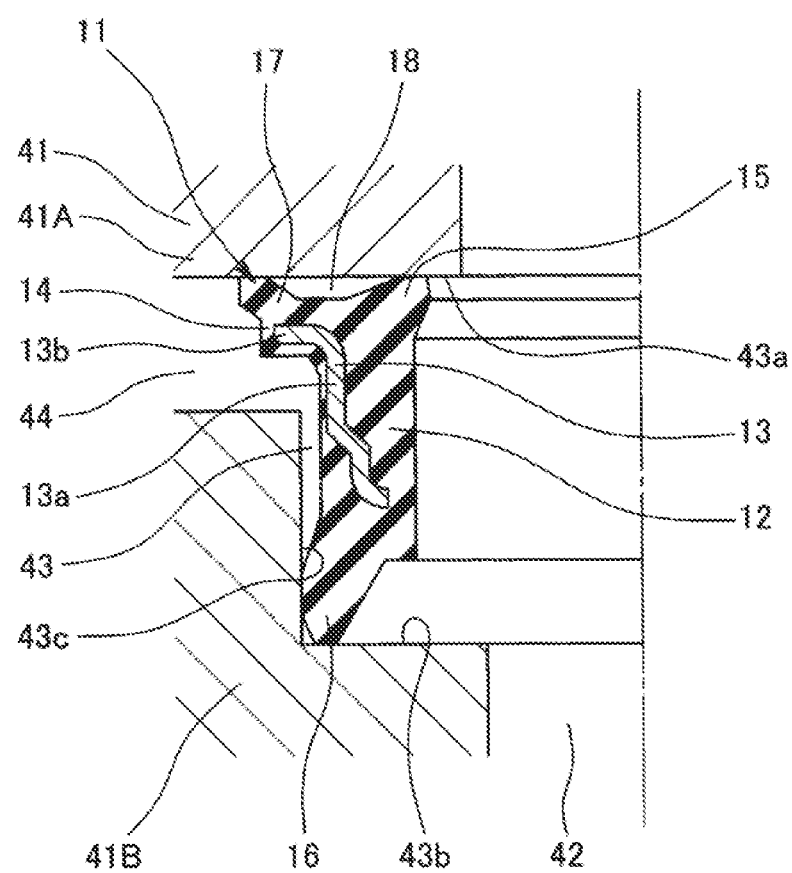
FIG. 4 is a diagram showing the gasket according to the third embodiment, and is a half sectional view showing a state where positive pressure is applied to the gasket from the inner diameter side.

FIGS. 3A, 3B, and 4 show a half section of the gasket 11 according to a third embodiment. The gasket 11 according to the present embodiment is applied to a joint seal or the like in an automatic transmission (AT) of a vehicle such as an automobile, and is mounted in the gasket mounting groove 43 provided on the inner diameter portion of the mounting member 41 that includes the hydraulic passage 42, and seals hydraulic pressure.

In the present embodiment, the hydraulic passage 42 is provided on the inner diameter side of the mounting member 41, and the gasket mounting groove 43 is provided on the inner diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B.

The gap 44 serves as a back-side hydraulic passage with respect to the gasket 11. Therefore, the gasket 11 according to this embodiment is mounted in the gasket mounting groove 43 that opens to the radially inside where the hydraulic passage 42 is present and is provided with the gap (the back-side hydraulic passage) 44 on its groove bottom surface.

As shown in FIG. 3A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially outside.

The reinforcement ring 13 is integrally provided with the annular flat portion 13b extending from the one axial end of the tubular portion 13a toward the radially outside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially inside.

The flange 14 is integrally provided with an annular one-end-side sub seal lip 17 extending from the flange 14 toward the one side in the axial direction and the radially outside.

The gasket body 12 is integrally provided with the annular other-end-side seal lip 16 extending obliquely from the other axial (in the drawing, lower) end of the gasket body 12 toward the other side in the axial direction and the radially outside.

An axial height dimension h1 of the one-end-side seal lip 15 is set to be smaller than a length dimension l2 of the one-end-side sub seal lip 17. In other words, the length dimension l2 of the one-end-side sub seal lip 17 is set to be larger than the axial height dimension h1 of the one-end-side seal lip 15 (h1<l2).

Preferably, the axial height dimension h1 of the one-end-side seal lip 15 in a free state before mounting of the gasket 11 is set to be smaller than a height dimension h2 of the one-end-side sub seal lip 17. In other words, the axial height dimension h2 of the one-end-side sub seal lip 17 is set to be larger than the axial height dimension h1 of the one-end-side seal lip 15 (h1<h2).

As shown in FIG. 3B, the gasket 11 is mounted in the annular gasket mounting groove 43 provided on the inner diameter portion of the mounting member 41. The gasket mounting groove 43 has a rectangular shape in cross-section, and opens to the radially inside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B. Respective outer diameter dimensions of the flange 14 and the one-end-side sub seal lip 17 are set to be larger than the diameter dimension of the bottom surface 43c of the mounting groove 43; therefore, when the gasket 11 is mounted in the mounting groove 43, at least a part of the flange 14 and the one-end-side sub seal lip 17 is housed in the gap 44.

When the gasket 11 is mounted in the mounting groove 43, the one-end-side sub seal lip 17 comes in contact with the one axial side surface 43a of the mounting groove 43. Depending on a groove width of the mounting groove 43, the one-end-side seal lip 15 forms a clearance between the one-end-side seal lip 15 and the one axial side surface 43a of the mounting groove 43. The other-end-side seal lip 16 comes in contact with the other axial side surface 43b and the bottom surface 43c of the mounting groove 43 at the same time.

Positive pressure acts on the gasket 11 from its inner diameter side, and thus the gasket 11 receives this inner-diameter-side positive pressure and seals this pressure. At this time, the outer diameter side of the gasket 11 (the side of the gap 44) is under negative pressure. Hereinafter, this state is referred to also as "under positive pressure".

Positive pressure may sometimes act on the gasket 11 from its outer diameter side (the side of the gap 44), and thus the gasket 11 receives this outer-diameter-side positive pressure and seals this pressure. At this time, the inner diameter side of the gasket 11 is under negative pressure. Hereinafter, this state is referred to also as "under negative pressure".

Under positive pressure, as shown in FIG. 4, the one-end-side seal lip 15 is subjected to the positive pressure from the inner diameter side of the gasket 11 and is pressed against the one axial side surface 43a of the mounting groove 43, and the other-end-side seal lip 16 is pressed against the bottom surface 43c of the mounting groove 43, thus the sealing is ensured.

When the gasket 11 has made transition from the state shown in FIG. 4 to the state under negative pressure, since a space 18 between the one-end-side seal lip 15 and the one-end-side sub seal lip 17 is sealed, this space 18 is under positive pressure, and thus, if pressure is applied, the entire gasket 11 is displaced to the other side in the axial direction. The length dimension l2 of the one-end-side sub seal lip 17 is set to be larger than the axial height dimension h1 of the one-end-side seal lip 15, and thus, if the entire gasket 11 is displaced to the other side in the axial direction, the one-end-side seal lip 15 moves away from the one axial side surface 43a of the mounting groove 43 as shown in FIG. 3B, and thereby the space 18 becomes under negative pressure. Therefore, positive pressure acts on the other axial end surface of the flange 14, thereby the entire gasket 11 is displaced to the one side in the axial direction, and the one-end-side sub seal lip 17 is pressed against the one axial side surface 43a of the mounting groove 43 (an end surface of the one mounting member 41A), and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

As another aspect of the present embodiment, for example, to prevent the gasket 11 from coming off the gasket mounting groove 43, an interference may be given to the outer periphery of the other-end-side seal lip 16.

Fourth Embodiment

The arrangement of components of the gasket 11 according to the third embodiment may be inverted in the radial direction. An aspect of this inversion is described as a fourth embodiment.

Figure 5A:
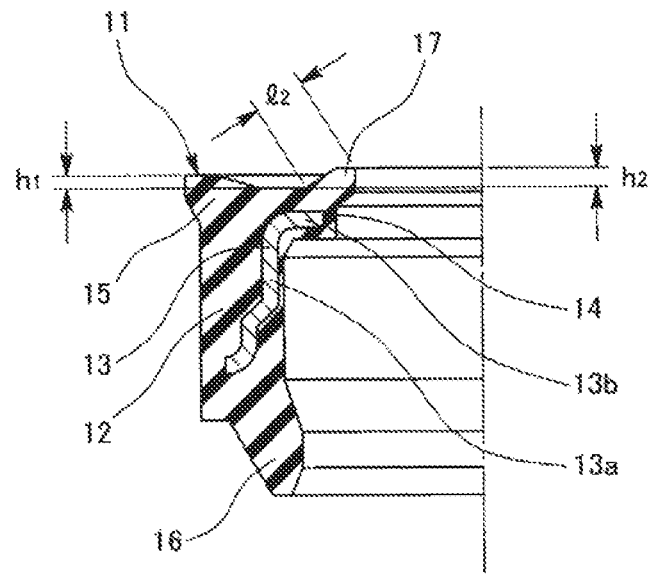
FIGS. 5A and 5B are diagrams showing a gasket according to a fourth embodiment.
Figure 5B:
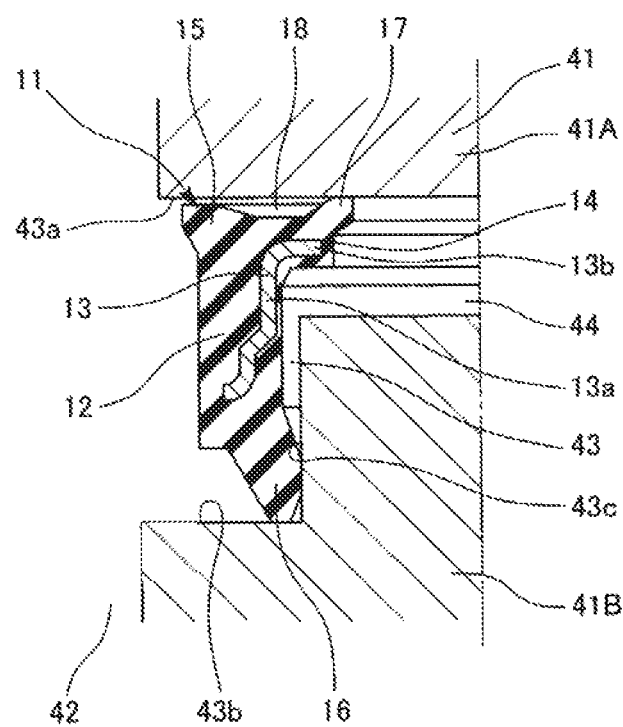
Figure 6:
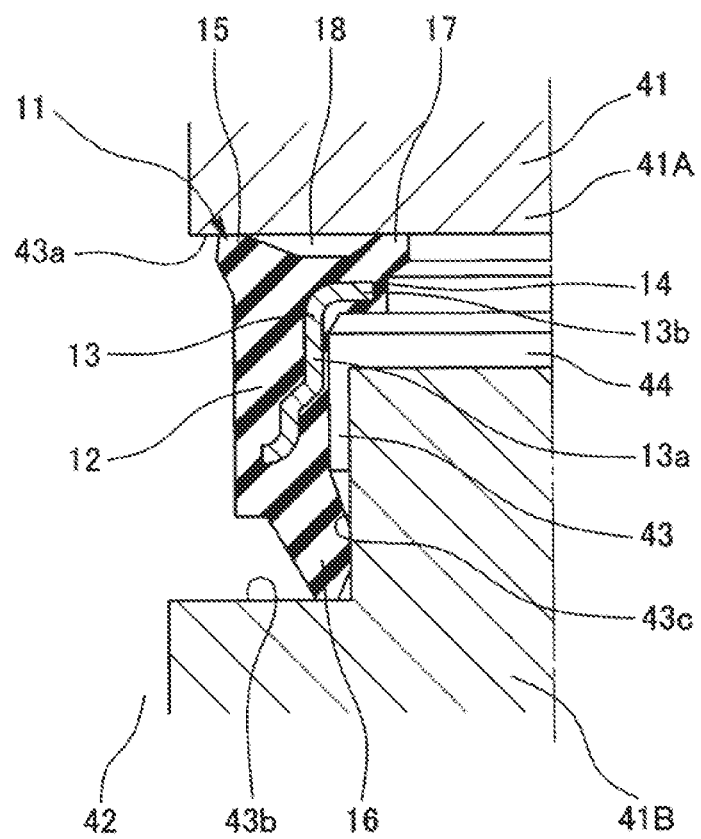
FIG. 6 is a diagram showing the gasket according to the fourth embodiment, and is a half sectional view showing a state where positive pressure is applied to the gasket from the outer diameter side.
Figure 7:
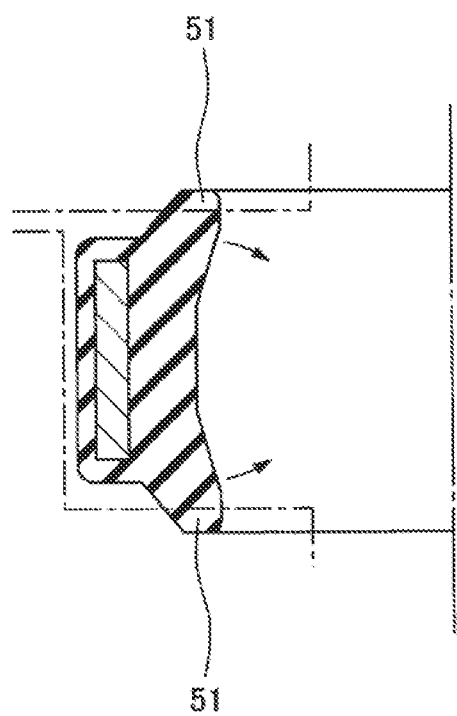
FIG. 7 is a cross-sectional view of a gasket according to the background art.

FIGS. 5A, 5B, and 6 show a half section of the gasket 11 according to the fourth embodiment. The gasket 11 according to the present embodiment is applied to a joint seal or the like in an automatic transmission (AT) of a vehicle such as an automobile, and is mounted in the gasket mounting groove 43 provided on the inner diameter portion of the mounting member 41 that includes the hydraulic passage 42, and seals hydraulic pressure.

In the present embodiment, the hydraulic passage 42 is provided on the outer diameter side of the mounting member 41, and the gasket mounting groove 43 is provided on the outer diameter portion of the mounting member 41 so as to open toward this hydraulic passage 42. Furthermore, the mounting member 41 is divided into two in the axial direction at the position of the one axial (in the drawing, upper) end of the bottom surface (the groove bottom surface) 43c of the gasket mounting groove 43, and is a combination of the one mounting member 41A and the other mounting member 41B. The gap 44 in the axial direction is provided between the two mounting members 41A and 41B. The gap 44 serves as a back-side hydraulic passage with respect to the gasket 11. Therefore, the gasket 11 according to this embodiment is mounted in the gasket mounting groove 43 that opens to the radially outside where the hydraulic passage 42 is present and is provided with the gap (the back-side hydraulic passage) 44 on its groove bottom surface.

That is, as shown in FIG. 5A, the gasket body 12 of the gasket 11 is formed by burying the reinforcement ring 13 made of a rigid material such as metal in an annular body (a rubber annular body) including a predetermined rubber-like elastic body, and this gasket body 12 having a rectangular shape in cross-section is integrally provided with the flange 14 extending from the one axial (in the drawing, upper) end of the gasket body 12 toward the radially inside.

The reinforcement ring 13 is integrally provided with the annular flat portion 13b extending from the one axial end of the tubular portion 13a toward the radially inside. The tubular portion 13a is buried in the gasket body 12 to make the gasket body 12 less likely to be deformed. The flat portion 13b is buried in the flange 14, or is disposed along the axial end surface of the flange 14. In either case, this flat portion 13b supports the flange 14, and thus the flange 14 is less likely to be deformed.

The gasket body 12 is integrally provided with the annular one-end-side seal lip 15 extending obliquely from the one axial end of the gasket body 12 toward the one side in the axial direction and the radially outside.

The flange 14 is integrally provided with the annular one-end-side sub seal lip 17 extending obliquely from the flange 14 toward the one side in the axial direction and the radially inside.

The gasket body 12 is integrally provided with the annular other-end-side seal lip 16 extending obliquely from the other axial (in the drawing, lower) end of the gasket body 12 toward the other side in the axial direction and the radially inside.

The axial height dimension h1 of the one-end-side seal lip 15 is set to be smaller than the length dimension l2 of the one-end-side sub seal lip 17. In other words, the length dimension l2 of the one-end-side sub seal lip 17 is set to be larger than the axial height dimension h1 of the one-end-side seal lip 15 (h1<l2).

Furthermore, preferably, the axial height dimension h1 of the one-end-side seal lip 15 in a free state before mounting of the gasket 11 is set to be smaller than the height dimension h2 of the one-end-side sub seal lip 17; in other words, the axial height dimension h2 of the one-end-side sub seal lip 17 is set to be larger than the axial height dimension h1 of the one-end-side seal lip 15 (h1<h2).

As shown in FIG. 5B, the gasket 11 is mounted in the annular gasket mounting groove 43 provided on the outer diameter portion of the mounting member 41 such as a housing. The gasket mounting groove 43 has a rectangular shape in cross-section, and opens to the radially outside. The mounting member 41 is divided into two in the axial direction at the position of the one axial end of the bottom surface 43c of the mounting groove 43, and is a combination of the one mounting member 41A and the other mounting member 41B. The gap 44 in the axial direction is provided between the two mounting members 41A and 41B, and respective inner diameter dimensions of the flange 14 and the one-end-side sub seal lip 17 are set to be smaller than the diameter dimension of the bottom surface 43c of the mounting groove 43; therefore, when the gasket 11 is mounted in the mounting groove 43, at least a part of the flange 14 and the one-end-side sub seal lip 17 is housed in the gap 44.

When the gasket 11 is mounted in the mounting groove 43, the one-end-side sub seal lip 17 comes in contact with the one axial side surface 43a of the mounting groove 43. Depending on a groove width of the mounting groove 43, the one-end-side seal lip 15 forms a clearance between the one-end-side seal lip 15 and the one axial side surface 43a of the mounting groove 43. The other-end-side seal lip 16 comes in contact with the other axial side surface 43b and the bottom surface 43c of the mounting groove 43.

Positive pressure acts on the gasket 11 from its outer diameter side, and thus the gasket 11 receives this outer-diameter-side positive pressure and seals this pressure. At this time, the inner diameter side of the gasket 11 (the side of the gap 44) is under negative pressure. Hereinafter, this state is referred to also as "under positive pressure".

Positive pressure may sometimes act on the gasket 11 from its inner diameter side (the side of the gap 44), and thus the gasket 11 receives this inner-diameter-side positive pressure and seals this pressure. At this time, the outer diameter side of the gasket 11 is under negative pressure. Hereinafter, this state is referred to also as "under negative pressure".

Under positive pressure, as shown in FIG. 6, the one-end-side seal lip 15 is subjected to the positive pressure from the outer diameter side of the gasket 11 and is pressed against the one axial side surface 43a of the mounting groove 43, and the other-end-side seal lip 16 is pressed against the bottom surface 43c of the mounting groove 43, and thus the sealing is ensured.

When the gasket 11 has made transition from the state shown in FIG. 6 to the state under negative pressure, since the space 18 between the one-end-side seal lip 15 and the one-end-side sub seal lip 17 is sealed, this space 18 is under positive pressure, and thus, if pressure is applied, the entire gasket 11 is displaced to the other side in the axial direction. The length dimension l2 of the one-end-side sub seal lip 17 is set to be larger than the axial height dimension h1 of the one-end-side seal lip 15, and thus, if the entire gasket 11 is displaced to the other side in the axial direction, the one-end-side seal lip 15 moves away from the one axial side surface 43a of the mounting groove 43 as shown in FIG. 5B, and thereby the space 18 becomes under negative pressure. Therefore, positive pressure acts on the other axial end surface of the flange 14, thereby the entire gasket 11 is displaced to the one side in the axial direction, and the one-end-side sub seal lip 17 is pressed against the one axial side surface 43a of the mounting groove 43 (the end surface of the one mounting member 41A), and thus the sealing is ensured.

Therefore, whether the inner diameter side of the gasket 11 is under positive pressure or negative pressure, the sealing can be ensured, and thus it is possible to ensure the sealing of both positive pressure and negative pressure even if the dimensional accuracy requirement of the gasket mounting groove 43 is relaxed.

As another aspect of the present embodiment, for example, to prevent the gasket 11 from coming off the gasket mounting groove 43, an interference may be given to the outer periphery of the other-end-side seal lip 16.

What is claimed is:

1. A sealing arrangement for sealing a mounting groove that is subjected to positive pressure and negative pressure, comprising:
    a first mounting member and a second mounting member that collectively define a hydraulic passage, the mounting groove being formed in one of the first mounting member and the second mounting member, and the first and second mounting members being separated by a gap;
    a gasket mounted in the mounting groove between the hydraulic passage and the gap, the gasket including an annular gasket body having a first axial end, a second axial end, and a reinforcement ring buried therein;
    the annular gasket body including a flange unitary therewith that extends radially outward from the first axial end of the gasket body in a direction either toward the hydraulic passage or toward the gap;
    the flange includes a first seal lip that extends at least axially outward from the flange, the first seal lip being extending from the flange at a location proximate either the hydraulic passage or the gap, and the first seal lip contacting a surface of the first mounting member or the second mounting member that faces the hydraulic passage and does not include the mounting groove; and
    the annular gasket body including a second seal lip that extends outward from the second axial end thereof to contact a bottom surface of the mounting groove,
    wherein upon receipt of a positive pressure by the annular gasket body in a direction from the hydraulic passage, the first seal lip comes into greater contact with the surface.

2. The sealing arrangement according to claim 1, wherein upon receipt of a negative pressure by the annular gasket body in a direction from the gap, the second seal lip deforms to stand up to the negative pressure such that an inclination angle of the second seal lip relative to a center axis of the gasket becomes smaller, which displaces the annular gasket body in a direction toward the first axial end and forces the first seal lip into greater contact with the surface.

3. The sealing arrangement according to claim 1, further comprising a third seal lip, the third seal lip extending at least axially outward from the flange at a location of the flange that is opposite to the location of the first seal lip, the first seal lip and the third seal lip being separated by a space.

4. The sealing arrangement according to claim 3, wherein upon receipt of a positive pressure by the annular gasket body in a direction from the hydraulic passage, the first seal lip comes into greater contact with the surface and the third seal lip is forced into contact with the surface to close and seal the space.

5. The sealing arrangement according to claim 4, wherein upon receipt of a negative pressure by the annular gasket body in a direction from the gap, the space is pressurized, which displaces the annular gasket body in a direction toward the second axial end.

\* \* \* \* \*